United States Patent
Chen

(10) Patent No.: US 10,060,576 B2
(45) Date of Patent: Aug. 28, 2018

(54) METHOD, DEVICE, AND APPARATUS FOR GIMBAL PARAMETER ADJUSTMENT

(71) Applicant: SZ DJI OSMO TECHNOLOGY CO., LTD., Shenzhen (CN)

(72) Inventor: Fazhan Chen, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/394,127

(22) Filed: Dec. 29, 2016

(65) Prior Publication Data

US 2017/0138534 A1    May 18, 2017

Related U.S. Application Data

(63) Continuation of application No. PCT/CN2014/081313, filed on Jun. 30, 2014.

(51) Int. Cl.
| | |
|---|---|
| *G03B 17/00* | (2006.01) |
| *F16M 13/04* | (2006.01) |
| *H02P 6/28* | (2016.01) |
| *G03B 17/56* | (2006.01) |

(52) U.S. Cl.
CPC ............... *F16M 13/04* (2013.01); *H02P 6/28* (2016.02); *F16M 2200/00* (2013.01); *G03B 17/561* (2013.01)

(58) Field of Classification Search
CPC .......... F16M 13/04; F16M 11/02; H02P 6/28; G03B 17/561; G03B 17/563
USPC ................... 248/550; 396/428; 352/242, 243
See application file for complete search history.

(56) References Cited

U.S. PATENT DOCUMENTS

| | | | | |
|---|---|---|---|---|
| 9,030,149 B1 * | 5/2015 | Chen | ...................... | F16M 13/04 |
| | | | | 318/638 |
| 9,765,926 B2 * | 9/2017 | Chen | ...................... | F16M 13/04 |
| 2017/0108162 A1 * | 4/2017 | Pan | ...................... | F16M 11/105 |
| 2017/0108761 A1 * | 4/2017 | Pan | ...................... | G03B 17/561 |

(Continued)

FOREIGN PATENT DOCUMENTS

| | | |
|---|---|---|
| CN | 1078958 A | 12/1993 |
| CN | 101668190 A | 3/2010 |

(Continued)

OTHER PUBLICATIONS

The World Intellectual Property Organization (WIPO) International Search Report for PCT/CN2014/081313 dated Mar. 27, 2015 pp. 1-6.

*Primary Examiner* — Todd M Epps
(74) *Attorney, Agent, or Firm* — Anova Law Group, PLLC

(57) ABSTRACT

Method, device, and apparatus for a gimbal parameter adjustment are provided. An exemplary method includes: controlling a supply of power to a motor upon detection of a gimbal parameter adjustment event, recording rotational angular velocity data of a gimbal axis controlled by the motor at respective time points, calculating angular acceleration data at the respective time points based on the rotational angular velocity data, determining a peak frequency within a predefined frequency band after performing a frequency conversion on the angular acceleration data, and configuring the peak frequency as a trap frequency of the motor to filter out a signal sending to the motor and having a frequency of the trap frequency.

13 Claims, 7 Drawing Sheets

(56) References Cited

U.S. PATENT DOCUMENTS

| | | | | |
|---|---|---|---|---|
| 2017/0115551 A1* | 4/2017 | Pan | ............... | F16F 15/28 |
| 2017/0227834 A1* | 8/2017 | Zhao | ............... | G03B 17/561 |
| 2017/0301230 A1* | 10/2017 | Liu | ............... | G08O 17/02 |

FOREIGN PATENT DOCUMENTS

| | | | |
|---|---|---|---|
| CN | 103001563 A | | 3/2013 |
| CN | 103024343 A | | 4/2013 |
| CN | 103841313 A | | 6/2014 |
| JP | 2007183356 A | | 7/2007 |
| JP | 2009141769 A | | 6/2009 |
| WO | 2002085663 A1 | | 10/2002 |

\* cited by examiner ial Application No. PCT/CN2014/081313, filed with the
State Intellectual Property Office of P. R. China on Jun. 30,
2014, the entire content of which is incorporated herein by
reference.

METHOD, DEVICE, AND APPARATUS FOR GIMBAL PARAMETER ADJUSTMENT

CROSS-REFERENCES TO RELATED APPLICATIONS

This application is a continuation application of International Application No. PCT/CN2014/081313, filed with the State Intellectual Property Office of P. R. China on Jun. 30, 2014, the entire content of which is incorporated herein by reference.

TECHNICAL FIELD

The present disclosure relates to the field of gimbal control technologies, and in particular, relates to method, device, and apparatus for gimbal parameter adjustment.

BACKGROUND

A gimbal apparatus is a carrying apparatus for mounting and fixing a camera. The gimbal apparatus can allow the carried camera to rotate in one or more directions through cooperation of a gimbal arm with a motor and to shoot images in a wider range. Generally, cameras with different types and sizes may be fixed, carried, and controlled by adjusting a fixture of a gimbal apparatus.

When replacing a camera in a gimbal apparatus, control parameters of the gimbal must be re-adjusted in order to allow the gimbal to operate normally, as different cameras have different inertia. For example, when a large inertia camera previously mounted on the gimbal is replaced with a small inertia camera, the inertia is reduced. The gimbal with the replaced small inertia camera may vibrate after the start, and a user needs to conduct multiple adjustments and tests to obtain suitable gimbal control parameters in order for the gimbal to operate normally. However, the gimbal parameter adjustments are complicated, and it is hard for an untrained person to perform such gimbal parameter adjustments.

SUMMARY

Embodiments of the present disclosure provide method, device, and apparatus for gimbal parameter adjustment, which can easily and rapidly perform parameter adjustments of the gimbal apparatus.

The embodiments of the present disclosure provide a gimbal parameter adjustment method, including: controlling a supply of power to a motor upon a detection of a gimbal parameter adjustment event and recording rotational angular velocity data of a gimbal axis controlled by the motor at respective time points; calculating angular acceleration data at the respective time points based on the rotational angular velocity data, and determining a peak frequency within a preset frequency band after performing a frequency conversion on the angular acceleration data; and configuring the peak frequency as a trap frequency of the motor to filter out a signal sending to the motor and having a frequency of the trap frequency.

Optionally, the controlling supply of power to a motor upon a detection of a gimbal parameter adjustment event and recording rotational angular velocity data of a gimbal axis controlled by the motor at respective time points includes: controlling a power supplying current to the motor to zero upon a detection of the gimbal parameter adjustment event; starting a timing process when the power supplying current is controlled to be zero and selecting a predefined reference current value to supply power to the motor when a timed duration reaches a predefined first duration threshold; and recording the rotational angular velocity data of the gimbal axis controlled by the motor at the respective time points in a power supplying process.

Optionally, the controlling a supply of power to a motor upon a detection of a gimbal parameter adjustment event and recording rotational angular velocity data of a gimbal axis controlled by the motor at respective time points includes: controlling a power supplying current to the motor to zero upon a detection of the gimbal parameter adjustment event; starting a timing process when the power supplying current is controlled to be zero, selecting a predefined reference current value to supply power to the motor when a timed duration reaches a predefined first duration threshold, recording initial rotational angular velocity data of the gimbal axis controlled by the motor at the respective time points in a power supplying process, controlling the power supplying current to the motor to zero when a power supply duration reaches a predefined second duration threshold, recording the initial rotational angular velocity data, and repeating the steps until the number of recording times reaches a predefined threshold of recording times; and averaging the initial rotational angular velocity data of the respective time points obtained in each power supplying process and using an averaged result as the rotational angular velocity data of the respective time points in the power supplying process.

Optionally, the method further includes: calculating a change rate of rotational angular velocity based on the recorded rotational angular velocity data at the respective time points and a recording duration; acquiring a predefined reference angular velocity change rate and a reference control loop proportional gain; and calculating a current actual proportional gain of a control loop of the gimbal axis controlled by the motor based on the calculated change rate of the rotational angular velocity, the reference angular velocity change rate, and the reference control loop proportional gain.

Optionally, controlling supply of power to a motor upon a detection of a gimbal parameter adjustment event and recording rotational angular velocity data of a gimbal axis controlled by the motor at respective time points include: detecting whether a gimbal parameter adjustment button is pressed and triggered, and if yes, determining that a gimbal parameter adjustment event is detected.

The embodiments of the present disclosure further provide a gimbal parameter adjustment device, including: a processing module for controlling a supply of power for a motor upon a detection of a gimbal parameter adjustment event and recording rotational angular velocity data of a gimbal axis controlled by the motor at respective time points; a calculation module for calculating angular acceleration data at the respective time points based on the rotational angular velocity data at the respective time points and determining a peak frequency within a preset frequency band after performing a frequency conversion on the angular acceleration data; and a configuration module for configuring the peak frequency as a trap frequency of the motor to filter out a signal sending to the motor and having a frequency of the trap frequency.

Optionally, the processing module includes: a first control unit for controlling a power supplying current to the motor to zero upon a detection of the gimbal parameter adjustment event; a first processing unit for starting a timing process when the power supplying current is controlled to be zero and selecting a predefined reference current value to supply power to the motor when a timed duration reaches a predefined first duration threshold; and a first recording unit for recording the rotational angular velocity data of the gimbal axis controlled by the motor at the respective time points in a power supplying process.

Optionally, the processing module includes: a second control unit for controlling a power supplying current to the motor to zero upon a detection of the gimbal parameter adjustment event; a second processing unit for starting a timing process when the power supplying current is controlled to be zero, selecting a predefined reference current value to supply power to the motor when a timed duration reaches a predefined first duration threshold, recording initial rotational angular velocity data of the gimbal axis controlled by the motor at the respective time points in a power supplying process, controlling the power supplying current to the motor to be zero when a power supply duration reaches a predefined second duration threshold, recording the initial rotational angular velocity data, and repeating the steps until the number of recording times reaches a predefined threshold of recording times; and a second recording unit for averaging the initial rotational angular velocity data of the respective time points obtained in each power supplying process and using an averaged result as the rotational angular velocity data of the respective time points in the power supplying process.

Optionally, the device further includes: a change calculation module for calculating a change rate of rotational angular velocity based on the recorded rotational angular velocity data of the respective time points and a recording duration; an acquisition module for acquiring a predefined reference angular velocity change rate and a reference control loop proportional gain; and a gain calculation module for calculating a current actual proportional gain of a control loop of the gimbal axis controlled by the motor based on the calculated change rate of the rotational angular velocity, the reference angular velocity change rate, and the reference control loop proportional gain.

Optionally, the device further includes: a detection module for detecting whether a gimbal parameter adjustment button is pressed and triggered, and if yes, determining that a gimbal parameter adjustment event is detected.

The embodiments of the present disclosure further provide a gimbal apparatus, including one or more gimbal axes, and a motor and a controller, configured to control the one or more gimbal axes to rotate. The controller is used for controlling a supply of power to a motor upon a detection of a gimbal parameter adjustment event, recording rotational angular velocity data of a gimbal axis controlled by the motor at respective time points, calculating angular acceleration data at the respective time points based on the rotational angular velocity data at the respective time points, determining a peak frequency within a predefined frequency band after performing a frequency conversion on the angular acceleration data, and configuring the peak frequency as a trap frequency of the motor to filter out a signal sending to the motor and having a frequency of the trap frequency.

Optionally, the controller is further used for calculating a change rate of rotational angular velocity based on the recorded rotational angular velocity data of the respective time points and a recording duration, acquiring a predefined reference angular velocity change rate and a reference control loop proportional gain, and calculating a current actual proportional gain of a control loop of the gimbal axis controlled by the motor based on the calculated change rate of the rotational angular velocity, the reference angular velocity change rate, and the reference control loop proportional gain.

Optionally, the gimbal apparatus further includes: a parameter adjustment button; and the controller being further used for detecting whether a gimbal parameter adjustment button is pressed and triggered, and if yes, determining that a gimbal parameter adjustment event is detected.

According to the embodiments of the present disclosure, when a user newly mounts a payload and needs to make a parameter adjustment, a trap frequency parameter can be automatically obtained based on rotational angular velocity conditions of relevant gimbal axes detected by a device such as a gyroscope. Based on the obtained trap frequency parameter, in an operation after the new payload is mounted, the posture of the mounted payload can be stably controlled. The implementation is simple, and the user is not required to participate in the configuration process, which saves time for the user, reduces labor cost, and meets user demands for automation and intelligence.

DETAILED DESCRIPTION

The technical solution in embodiments of the present disclosure is clearly and completely described in the following detailed description with reference to the accompanying drawings of the embodiments of the present disclosure. It is apparent that the embodiments described herein are merely some embodiments of the present. Based on the described embodiments in the present disclosure, all other embodiments obtained by persons of ordinary skill in the art without making creative efforts should all fall within the scope of the present disclosure.

According to the embodiments in the present disclosure, when a user mounts a new payload (for example, a new camera and the like) and needs to adjust gimbal related parameters such as a trap frequency of a gimbal trapper, rotational angular velocity response data of a gimbal axis is recorded in a power supplying process. The recorded rotational angular velocity response data is processed to obtain angular acceleration data, and a frequency conversion (such as Fourier transform) is performed on the angular acceleration data. A peak frequency in a high frequency band after conversion is used as a trap frequency parameter to then complete adjustment of the parameters. At the same time, a control loop proportional gain of a gimbal control loop is further adjusted.

Figure 1:
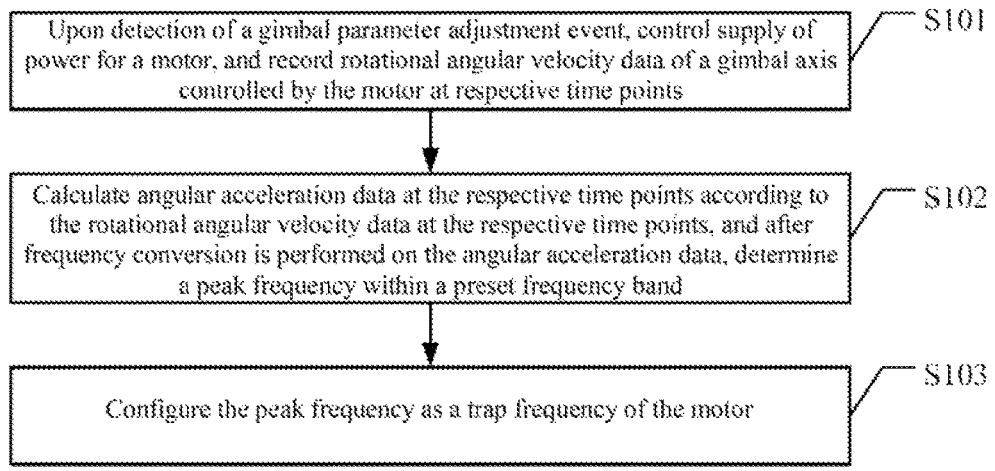
FIG. 1 is a schematic flowchart of one gimbal parameter adjustment method according to some embodiments of the present disclosure.

For example, referring to FIG. 1, a schematic flowchart of an exemplary gimbal parameter adjustment method is shown according to some embodiments of the present disclosure. The exemplary gimbal parameter adjustment method can be implemented by controllers in a variety of electrically-controlled gimbal apparatuses. For example, the exemplary method includes:

S101: Upon detection of a gimbal parameter adjustment event, a supply of power to a motor is controlled, and rotational angular velocity data of a gimbal axis controlled by the motor at respective time points is recorded.

After a user mounts a new payload onto a gimbal apparatus and needs to adjust a parameter such as a trap frequency of the gimbal, a controller of the gimbal can be notified to adjust the parameter through a mechanical button or a touch control button previously disposed on the gimbal or by sending a voice control instruction or by sending a control instruction via a parameter adjustment terminal. At this point, the controller of the gimbal apparatus can detect the corresponding user's operation or instruction to confirm the gimbal parameter adjustment.

The motor is a rotation-controlling motor on any axis of the gimbal apparatus. For example, for a three-axis gimbal apparatus, the motors undergoing parameter adjustments are respectively: a motor that controls the gimbal to rotate about a pitch axis, a motor that controls the gimbal to rotate about a roll axis, and a motor that controls the gimbal to rotate about a yaw axis.

In S101, a current of the motor can be first controlled to be zero, and then power is supplied to the motor after a time lapse to ensure that the motor does not rotate, so that an angular velocity with respect to the gimbal axis controlled by the corresponding motor can start from zero. After power is supplied for a predefined duration, the power supply is stopped to allow subsequent processing based on the recorded angular velocity data.

In some embodiments, in S101, a plurality of power-supplying cycles can also be successively performed to supply power, and the rotational angular velocity data can be an average rotational angular velocity data averaged based on the plurality of power-supplying cycles to provide better accuracy.

Figure 2:
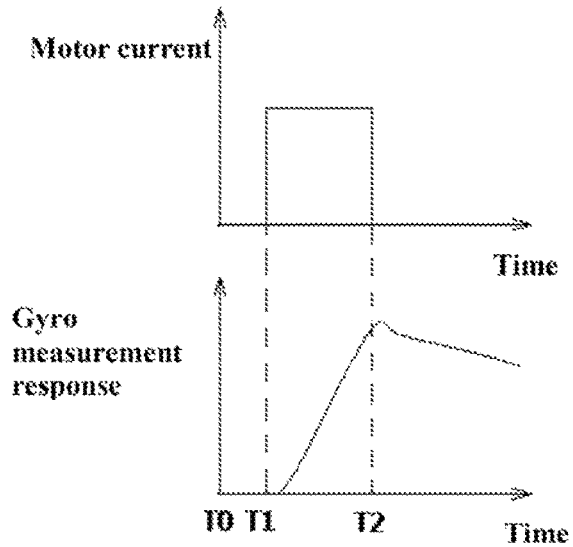
FIG. 2 is a schematic diagram of a response curve of power supply versus angular velocity according to some embodiments of the present disclosure.

For example, as the schematic diagram shown in FIG. 2, when a user presses down a parameter adjustment button at time T0, a power supplying current of the motor is controlled to be zero. After a period of time, at time T1, the power supplying current of the motor is controlled to be a reference value, and recording of angular velocity response data of a gyroscope disposed on a given gimbal axis can be started. At time T2, the power supplying is stopped. Then, the power supplying current of the motor is controlled to be zero once again for recording rotational angular velocity data of the next cycle to obtain more accurate angular velocity data with respect to the gimbal axis during power-on.

S102: Angular acceleration data at each of the respective time points is calculated based on the rotational angular velocity data at the respective time points, and after a frequency conversion performed on the angular acceleration data, a peak frequency within a predefined frequency band is determined.

For example, an angular acceleration response data can be obtained directly by differentiating with respect to time the rotational angular velocity data obtained in S101. The frequency conversion may be performed via a fast Fourier transform, and a peak frequency is determined from a high frequency band (for example, including those greater than 30 Hz) after the frequency conversion is performed.

S103: The peak frequency is configured as a trap frequency of the motor to filter out a signal that is to be sent to the motor and that has a frequency the same as the trap frequency.

In fact, the determined peak frequency can be a structural resonance point frequency. After the peak frequency is configured as a trap frequency parameter of the motor, a trapper capable of filtering an output signal of the controller in the gimbal apparatus can, based on the trap frequency, eliminate a signal having a frequency the same as the trap frequency in the control signals outputted by the controller. In this manner, during controlling of the newly mounted payload after the parameter configuration, the posture of the mounted payload can be stably controlled.

According to some embodiments of the present disclosure, when a user newly mounts a payload and needs to make a parameter adjustment, a trap frequency parameter can be automatically obtained based on the rotational angular velocity conditions of relevant gimbal axes detected by a device, such as a gyroscope, and a frequency conversion is performed to obtain a trap frequency parameter. Based on the obtained trap frequency parameter, in an operation after the new payload is mounted, the posture of the mounted payload can be more stably controlled. The implementation is simple, and there is no need for the user to conduct the configuration process, which saves time for the user, reduces labor cost, and meets user demands for automation and intelligence.

Figure 3:
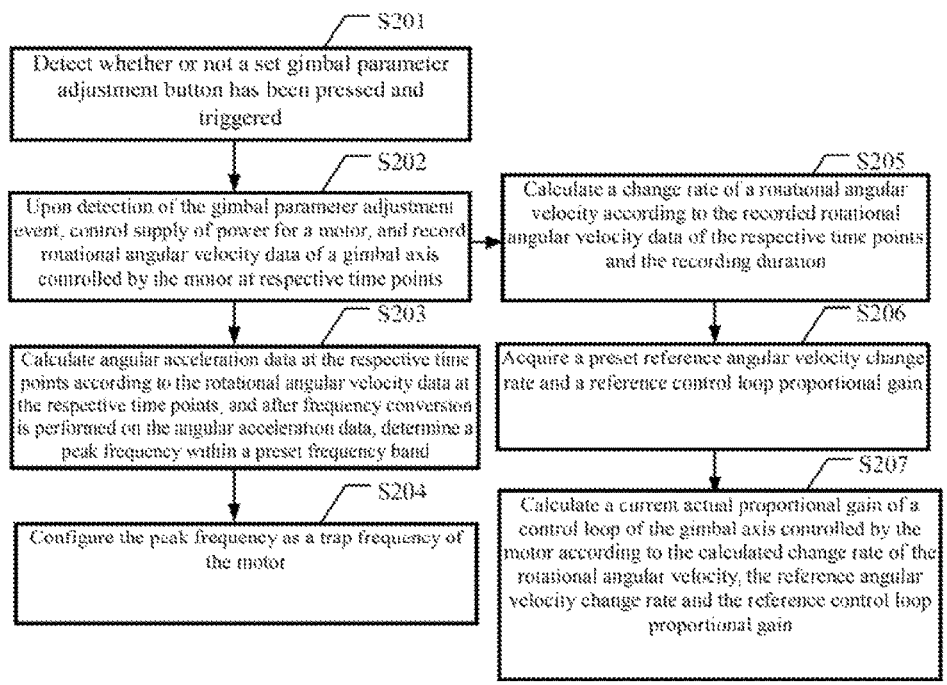
FIG. 3 is a schematic flowchart of another gimbal parameter adjustment method according to some embodiments of the present disclosure.

Referring to FIG. 3, a schematic flowchart of another exemplary gimbal parameter adjustment method according to some embodiments of the present disclosure is provided. The exemplary gimbal parameter adjustment method may be implemented by controllers in a variety of electrically-controlled gimbal apparatuses. For example, the method includes:

S201: Whether a configured gimbal parameter adjustment button is pressed and triggered is detected, and if yes, a gimbal parameter adjustment event is detected.

The gimbal parameter adjustment button may be a mechanical button previously disposed on the gimbal apparatus. The controller, when having received a triggering signal indicating that the mechanical button is pressed down, can determine that a gimbal parameter adjustment event has occurred and a gimbal user needs to make a parameter adjustment of the gimbal apparatus so that a stable control over the newly mounted payload can be realized.

S202: Upon detection of the gimbal parameter adjustment event, a supply of power to a motor is controlled, and rotational angular velocity data of a gimbal axis controlled by the motor at respective time points is recorded.

S203: Angular acceleration data at each of the respective time points is calculated based on the rotational angular velocity data at the respective time points, and after a frequency conversion is performed on the angular acceleration data, a peak frequency within a predefined frequency band is determined.

S204: The peak frequency is configured as a trap frequency of the motor to filter out a signal that is to be sent to the motor and that has a frequency the same as the trap frequency.

Reference can be made to the relevant description of FIG. 1 for the process of obtaining the trap frequency parameter. In some embodiments of the present disclosure, exemplary steps S205 to S207 may be performed during the determination and configuration processes of the trap frequency parameter, after the rotational angular velocity data of the respective time points is obtained.

S205: A change rate of rotational angular velocity is calculated, based on the recorded rotational angular velocity data at the respective time points and a recording duration.

The change rate of rotational angular velocity may be a ratio of an angular velocity variation in a certain time period over the duration of the time period. In some embodiments, the change rate of rotational angular velocity may refer to a rate of change of rotational angular velocity, which may indicate an angular acceleration (or angular acceleration data).

Referring back to FIG. 2, as an example, from time T (when an angular velocity is present) to time T2, an equation for a change rate of rotational angular velocity may be:

$$v = \frac{\omega_{T2} - \omega_T}{T_2 - T};$$

where v is the change rate of rotational angular velocity, $\omega_{T2}$ is the rotational angular velocity at the time T2, $\omega_T$ is the rotational angular velocity at the time T, and T2 and T are two different time points.

S206: A predefined reference change rate of angular velocity and a reference control loop proportional gain are acquired.

S207: A current actual proportional gain of a control loop of the gimbal axis controlled by the motor is calculated based on the calculated change rate of rotational angular velocity, the reference change rate of angular velocity, and the reference control loop proportional gain.

The reference change rate of angular velocity is, for the same gimbal motor and a gimbal axis controlled by the gimbal motor, a change rate $v_0$ of reference rotational angular velocity calibrated using a reference mass block during production. The reference control loop proportional gain is a proportional gain $K_{p0}$ used in the case of the reference mass block.

In some embodiments of the present disclosure, an exemplary method for calculating an actual proportional gain $K_p$ of a control loop may include: having a ratio of the calculated change rate v of rotational angular velocity over the change rate $v_0$ of reference rotational angular velocity, multiplied by the reference control loop proportional gain $K_{p0}$. A corresponding equation may be as follows:

$$K_p = \frac{v}{v_0} = K_{p0}.$$

A control loop from the controller to the motor (gimbal axis) is controlled based on the actual proportional gain calculated in S207, which allows the gimbal mounted with the new payload to more stably control the posture of the payload.

Figure 4:
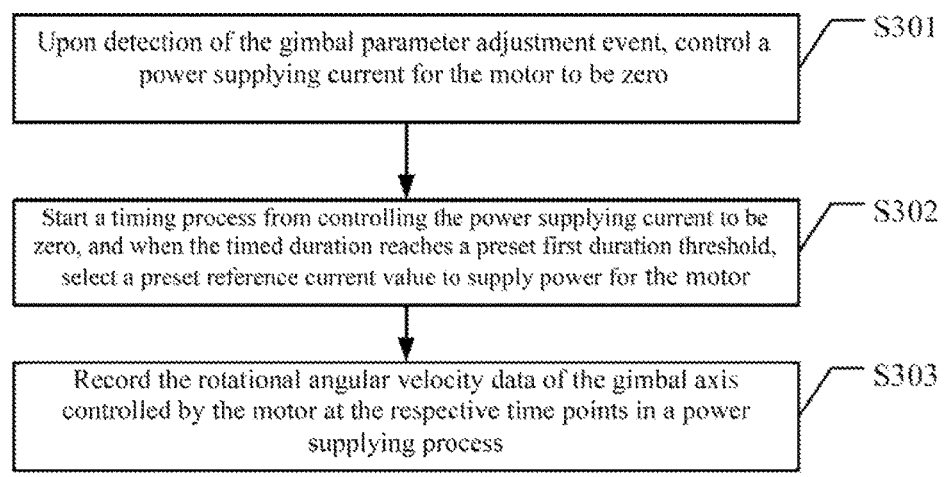
FIG. 4 is a schematic diagram of an exemplary method of obtaining rotational angular velocity data according to some embodiments of the present disclosure.

For example, referring to FIG. 4, an exemplary method of obtaining rotational angular velocity data according to some embodiments of the present disclosure is provided. The exemplary method may correspond to the above exemplary step S101 or S202, and specifically, the method includes:

S301: Upon detection of the gimbal parameter adjustment event, a power supplying current to the motor is controlled to be zero.

S302: A timing is started from when the power supplying current is controlled to be zero, and when the timed duration reaches a predefined first duration threshold, a predefined reference current value is selected to supply power to the motor.

For example, in FIG. 2, the first duration threshold is from time T0 to time T1.

S303: Rotational angular velocity data of the gimbal axis controlled by the motor at the respective time points in a power supplying process is recorded.

The power supplying process is within the time range from time T1 to time T2.

By performing above exemplary steps S301 to S303, the rotational angular velocity data can be more rapidly obtained for the subsequent processes to obtain the trap frequency parameter and the actual control loop proportional gain.

Figure 5:
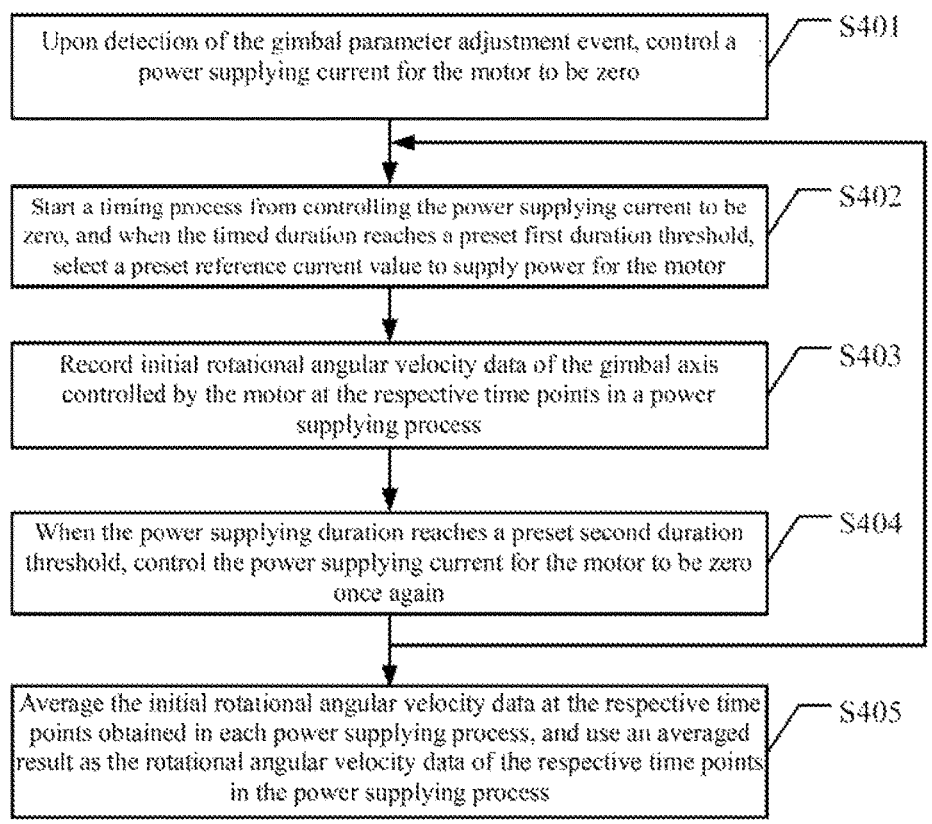
FIG. 5 is a schematic diagram of another method of obtaining rotational angular velocity data according to some embodiments of the present disclosure.

For example, referring back to FIG. 5, another exemplary method of obtaining rotational angular velocity data according to some embodiments of the present disclosure is provided. The exemplary method may correspond to the above exemplary step S101 or S202, and specifically, the method includes:

S401: Upon detection of the gimbal parameter adjustment event, a power supplying current to the motor is controlled to be zero.

S402: A timing process is started from when the power supplying current is controlled to be zero, and when the timed duration reaches a predefined first duration threshold, a current with a selected predefined reference current value is supplied to the motor.

S403: Initial rotational angular velocity data of the gimbal axis controlled by the motor at the respective time points in a power supplying process is recorded.

S404: When the power supplying duration reaches a predefined second duration threshold, the power supplying current to the motor is controlled to be zero once again. The above exemplary steps S402 to S404 are repeated, until the number of recording times of initial rotational angular velocity data reaches a predefined threshold number of recording times. For example, recording of initial rotational angular velocity data may be performed p in four periods (four times).

S405: The initial rotational angular velocity data of the respective time points obtained in each power supplying process is averaged, and an averaged result is used as the rotational angular velocity data of the respective time points in the power supplying process.

By performing the above exemplary steps S401 to S405, the rotational angular velocity data can be more accurately obtained for the subsequent processes to obtain the trap frequency parameter and the actual control loop proportional gain.

According to some embodiments of the present disclosure, when a user newly mounts a payload and needs to make a parameter adjustment, a trap frequency parameter and an actual control loop proportional gain can be automatically obtained based on the rotational angular velocity conditions of relevant gimbal axes detected by a device such as a gyroscope, so as to ensure that, in an operation after the new payload is mounted to the gimbal, the posture of the mounted payload can be controlled more stably. The implementation is simple, and the user is not required to participate in the configuration process, which saves the time for the user, reduces labor cost, and meets user demands for automation and intelligence.

A gimbal parameter adjustment device and a gimbal apparatus according to embodiments of the present disclosure are described below in detail.

Figure 6:
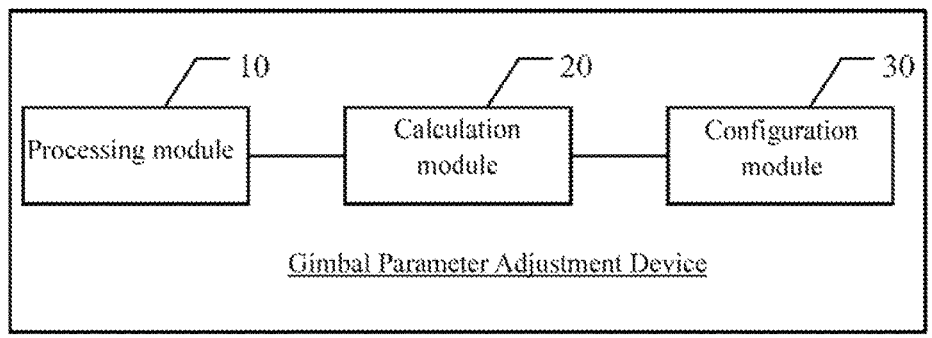
FIG. 6 is a schematic structural diagram of one gimbal parameter adjustment device according to some embodiments of the present disclosure.

For example, referring to FIG. 6, an exemplary gimbal parameter adjustment device according to some embodiments of the present disclosure is provided. The exemplary gimbal parameter adjustment device according to some embodiments of the present disclosure may be disposed in the gimbal apparatus. Specifically, the device includes:

a processing module 10 for, upon detection of a gimbal parameter adjustment event, controlling a supply of power to a motor, and recording rotational angular velocity data of a gimbal axis controlled by the motor at respective time points;

a calculation module 20 for calculating angular acceleration data at the respective time points based on the rotational angular velocity data at the respective time points and performing a frequency conversion on the angular acceleration data, and determining a peak frequency within a predefined frequency band; and a configuration module 30 for configuring the peak frequency as a trap frequency of the motor to filter out a signal that is to be sent to the motor and that has a frequency the same as the trap frequency.

After a user mounts a new payload onto a gimbal apparatus and needs to adjust a parameter such as a trap frequency of the gimbal, a controller of the gimbal can be notified to adjust the parameter through a mechanical button or a touch control button previously disposed on the gimbal or by sending a voice control instruction or by sending a control instruction by a parameter adjustment terminal. At this point, the processing module 10 can detect the corresponding user's operation or instruction and to confirm the gimbal parameter adjustment.

The motor is a rotation-controlling motor on any axis of the gimbal apparatus. For example, for a three-axis gimbal apparatus, the motors undergoing parameter adjustments are respectively: a motor that controls the gimbal to rotate about a pitch axis, a motor that controls the gimbal to rotate about a roll axis, and a motor that controls the gimbal to rotate about a yaw axis.

The processing module 10 can first control a current of the motor to be zero and then supply power to the motor after a time lapse to ensure that the motor does not rotate, so that an angular velocity with respect to the gimbal axis controlled by the motor can start from zero. After power is supplied for a predefined duration, the power supply is stopped to allow subsequent processing based on the recorded angular velocity data.

In some embodiments, the processing module 10 may also supply power by performing a plurality of power-supplying cycles successively to obtain more accurate rotational angular velocity data by averaging rotational angular velocity data based on the plurality of power-supplying cycles.

The calculation module 20 may be configured to obtain an angular acceleration response data directly by differentiating with respect to time the rotational angular velocity data obtained by the processing module 10. The frequency conversion may be performed via a fast Fourier transform, and a peak frequency is determined from a high frequency band (for example, including those greater than 30 Hz) after the frequency conversion is performed.

In fact, the determined peak frequency can be a structural resonance point frequency. After the configuration module 30 configures the peak frequency as a trap frequency parameter of the motor, a trapper capable of filtering an output signal of the controller in the gimbal apparatus can, based on the trap frequency, eliminate a signal having a frequency the same as the trap frequency in the control signals outputted by the controller. In this manner, during controlling of the newly mounted payload after the parameter configuration, the posture of the mounted payload can be stably controlled.

According to some embodiments of the present disclosure, when a user newly mounts a payload and needs to make a parameter adjustment, a trap frequency parameter can be automatically obtained based on the rotational angular velocity conditions of relevant gimbal axes detected by a device, such as a gyroscope, and a frequency conversion is performed to obtain a trap frequency parameter. Based on the obtained trap frequency parameter, in an operation after the new payload is mounted, the posture of the mounted payload can be more stably controlled. The implementation is simple, and there is no need for the user to conduct the configuration process, which saves time for the user, reduces labor cost, and meets user demands for automation and intelligence.

Figure 7:
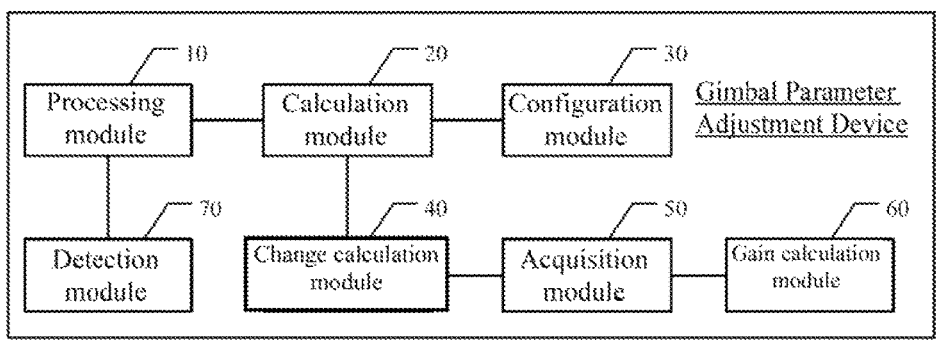
FIG. 7 is a schematic structural diagram of another gimbal parameter adjustment device according to some embodiments of the present disclosure.

For example, referring to FIG. 7, another exemplary gimbal parameter adjustment device according to some embodiments of the present disclosure is provided. The exemplary gimbal parameter adjustment device may be disposed in a gimbal apparatus. For example, the device includes the processing module 10, the calculation module 20, and the configuration module 30. The exemplary gimbal parameter adjustment device further includes:

a change calculation module 40 for calculating a change rate of rotational angular velocity based on the recorded rotational angular velocity data of the respective time points and the recording duration;

an acquisition module 50 for acquiring a predefined reference angular velocity change rate and a reference control loop proportional gain; and a gain calculation module 60 for calculating a current actual proportional gain of a control loop of the gimbal axis controlled by the motor based on the calculated change rate of rotational angular velocity, the reference angular velocity change rate, and the reference control loop proportional gain.

Reference can be made to the calculation methods and equations in the above method embodiments for the specific calculation manner in which the change calculation module 40 and the gain calculation module 60 calculate the change rate from the rotational angular velocity obtained by the processing module 10.

Further optionally, the device further includes a detection module 70 for detecting whether a set gimbal parameter adjustment button is pressed and triggered, and if yes, determining that the gimbal parameter adjustment event is detected.

The gimbal parameter adjustment button may be a mechanical button previously disposed on the gimbal apparatus. The detection module 70, when having received a triggering signal indicating that the mechanical button is pressed down, can determine that a gimbal parameter adjustment event has occurred and a gimbal user needs to make a parameter adjustment of the gimbal apparatus, so that a stable control over the newly mounted payload can be realized. The detection module 70, by sending a triggering signal, causes the processing module 10 to perform a corresponding function.

Figure 8:
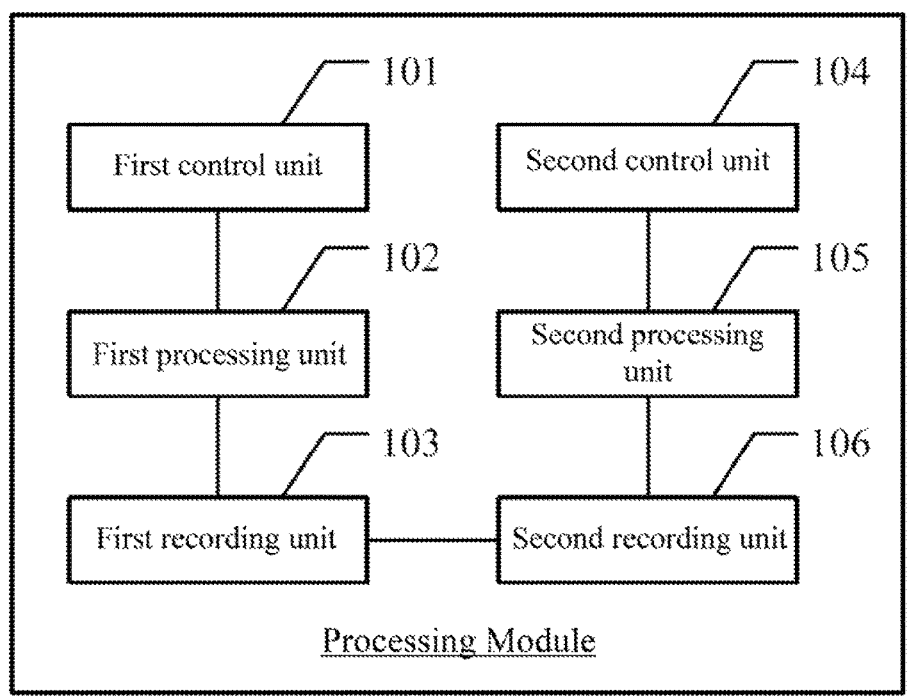
FIG. 8 is one schematic structural diagram of the processing module in FIG. 7.

Optionally, as shown in FIG. 8, the processing module 10 may include:

a first control unit 101 for, upon detection of the gimbal parameter adjustment event, controlling a power supplying current to the motor to be zero;

a first processing unit 102 for starting the timing from when the power supplying current is controlled to be zero, and when the timed duration reaches a predefined first duration threshold, and selecting a predefined reference current value to supply power to the motor; and a first recording unit 103 for recording the rotational angular velocity data of the gimbal axis controlled by the motor at the respective time points in a power supplying process.

Using the first control unit 101, the first processing unit 102, and the first recording unit 103 described above, rotational angular velocity data can be more rapidly obtained for subsequently processing to obtain the trap frequency parameter and the actual control loop proportional gain.

The processing module may further include:

a second control unit 104 for, upon detection of the gimbal parameter adjustment event, controlling a power supplying current to the motor to be zero;

a second processing unit 105 for starting the timing from when the power supplying current is controlled to be zero, selecting a predefined reference current value to supply power to the motor when the timed duration reaches a predefined first duration threshold, recording initial rotational angular velocity data of the gimbal axis controlled by the motor at the respective time points in a power supplying process, controlling the power supplying current to the motor to be zero once again when the power supply duration reaches a predefined second duration threshold, and repeatedly performing the recording a predefined number of times; and a second recording unit 106 for averaging the initial rotational angular velocity data at the respective time points obtained in each power supplying process, and using an averaged result as the rotational angular velocity data of the respective time points in the power supplying process.

Using the second control unit 104, the second processing unit 105, and the second recording unit 106 described above, rotational angular velocity data can be more accurately obtained for the subsequent processes to obtain the trap frequency parameter and the actual control loop proportional gain.

During specific exemplary implementations, the processing module 10 may simultaneously include a combination of the first control unit 101, the first processing unit 102, and the first recording unit 103 described above and a combination of the second control unit 104, the second processing unit 105, and the second recording unit 106 described above, so as to select different combinations according to actual needs (e.g., for rapidity or accuracy) of the user to perform acquisition of the rotational angular velocity data.

According to some embodiments of the present disclosure, when a user newly mounts a payload and needs to make a parameter adjustment, a trap frequency parameter and an actual control loop proportional gain can be automatically obtained based on the rotational angular velocity conditions of relevant gimbal axes detected by a device such as a gyroscope, so as to ensure that, in a use process after the new payload is mounted to the gimbal, the posture of the mounted payload can be controlled more stably. The implementation is simple, and the user is not required to participate in the configuration process, which saves time for the user, reduces labor cost, and meets user demands for automation and intelligence.

Figure 9:
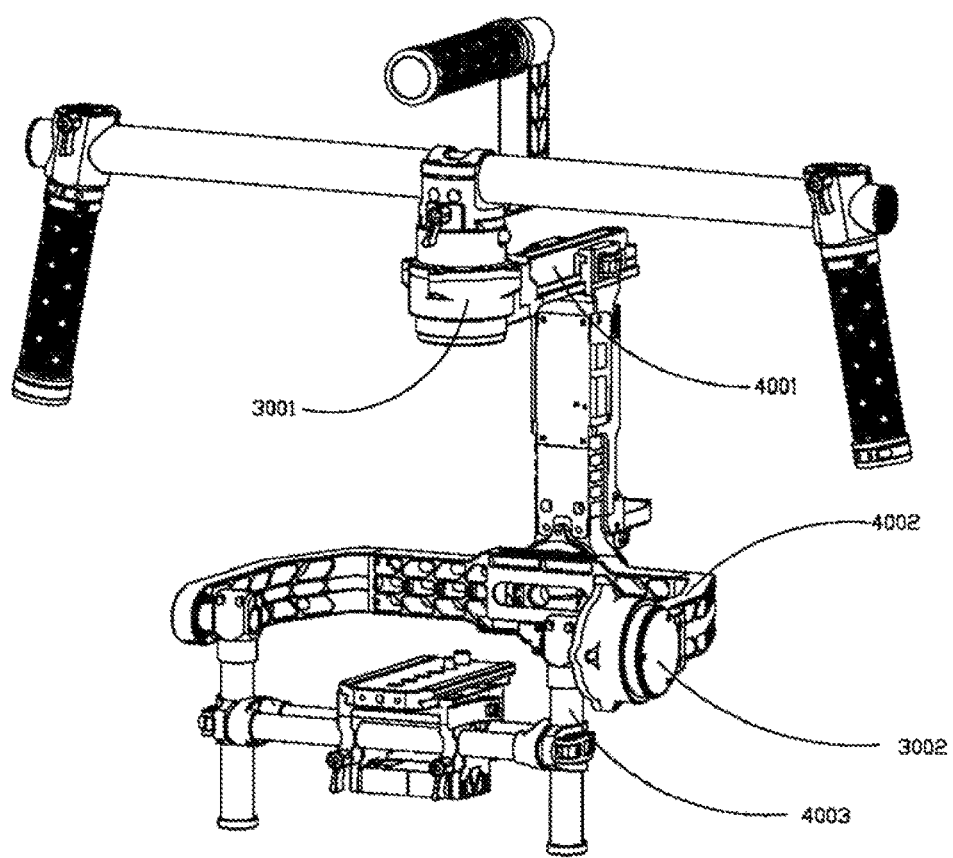
FIG. 9 is a schematic structural diagram of a gimbal apparatus according to some embodiments of the present disclosure.

Referring to FIG. 9, an exemplary gimbal apparatus according to some embodiments of the present disclosure is provided. The exemplary gimbal apparatus includes respective gimbal axes. Any number of gimbal axes may be included in the disclosed gimbal apparatus, although for illustration purposes, the gimbal apparatus described herein includes a three-axis gimbal as an example. The exemplary gimbal axes include: a yaw axis 4001, a roll axis 4002, and a pitch axis 4003. The gimbal apparatus further includes a motor and a controller that control the gimbal axes to rotate. For example, the motor includes: a motor 3001 connected between the yaw axis 4001 and a component such as an external handheld apparatus, a motor 3002 connected between the roll axis 4002 and the yaw axis 4001, and a motor 3003 connected between the roll axis 4002 and the pitch axis 4003.

The controller is used for: upon detection of a gimbal parameter adjustment event, controlling supply of power to a motor, and recording rotational angular velocity data of a gimbal axis controlled by the motor at respective time points; calculating angular acceleration data at the respective time points based on the rotational angular velocity data at the respective time points, and after a frequency conversion is performed on the angular acceleration data, determining a peak frequency within a predefined frequency band; and configuring the peak frequency as a trap frequency of the motor to filter out a signal that is to be sent to the motor and that has a frequency the same as the trap frequency.

The rotational angular velocity data of the gimbal axis controlled by the motor at the respective time points can be detected through a gyroscope and transmitted to the controller. The gyroscope is disposed on each of the yaw axis 4001, the roll axis 4002 and the pitch axis 4003, respectively, for detecting rotational angular velocity data of each axis under the control of the controller. The rotational acceleration data on the gimbal axis is acquired and processed in the same manner, and a trap frequency parameter and a control loop proportional gain on each axis are obtained.

Optionally, the controller is further used for calculating a change rate of rotational angular velocity based on the recorded rotational angular velocity data of the respective time points and the recording duration, acquiring a predefined reference angular velocity change rate and a reference control loop proportional gain, and calculating a current actual proportional gain of a control loop of the gimbal axis controlled by the motor based on the calculated change rate of rotational angular velocity, the reference angular velocity change rate and the reference control loop proportional gain.

Optionally, the gimbal apparatus further includes a parameter adjustment button. The parameter adjustment button may be a mechanical button. The controller is further used for detecting whether a configured gimbal parameter adjustment button is pressed and triggered, and if yes, determining that the gimbal parameter adjustment event is detected.

Reference can be made to the related description in the corresponding embodiments of FIG. 1 to FIG. 8 for specific implementation of the controller.

According to some embodiments of the present disclosure, when a user newly mounts a payload and needs to make a parameter adjustment, a trap frequency parameter and an actual control loop proportional gain can be automatically obtained based on rotational angular velocity conditions of relevant gimbal axes detected by a device, such as a gyroscope, so as to ensure that, in a use operation after the new payload is mounted to the gimbal, the posture of the mounted payload can be controlled more stably. The implementation is simple, and the user is not required to participate in the configuration process, which saves time for the user, reduces labor cost, and meets user demands for automation and intelligence.

As used herein, the terms "rotational angular velocity response data", "angular velocity response data", "rotational angular velocity data", and "angular velocity data" may be interchangeably used in the present disclosure.

In various embodiments of the present disclosure, it should be understood that the disclosed device and method may be implemented by other suitable manners. The device described above is merely for illustrative. For example, the units may be merely partitioned by logic function. In practice, other partition manners may also be possible. For example, various units or components may be combined or integrated into another system, or some features may be omitted or left unexecuted. In addition, mutual coupling, direct coupling, or communication displayed or discussed herein may be indirect coupling or communication connection in electrical, mechanical, or other forms through some interfaces, apparatus, or units.

Units described as separated components may or may not be physically separated, and the components serving as display units may or may not be physical units. That is, the components may be located at one position or may be distributed over various network units. Optionally, some or all of the units may be selected to realize the purpose of solutions of embodiments herein according to practical needs.

Further, the various functional units of various embodiments of the invention may be integrated into one processing unit, or may present individually. Two or more units may be integrated into one unit. The integrated unit may be realized in a hardware form, or in a form combining the hardware and software functional units.

When the described functions are implemented as software function units, and are sold or used as independent products, they may be stored in a computer accessible storage medium. Based on such understanding, the technical solutions of the present disclosure, or the portions contributing over the prior art may be embodied in the form of a software product. The computer software product may be stored in a storage medium, and include several instructions to instruct a computer device (e.g., a personal computer, a server, or a network device) to execute all or some of the method steps of each embodiment. The storage medium described above may include portable storage device, read-only memory (ROM), random access memory (RAM), a magnetic disc, an optical disc or any other media that may store program codes.

Described above are merely exemplary embodiments of the present disclosure, but the protection scope of the present disclosure is not limited thereto. Any modifications or substitution readily conceivable by those skilled in the art within the scope of the technology disclosed herein shall fall within the protection scope of the present invention. Thus, the protection scope of the present invention is subject to the appended claims.

What is claimed is:

1. A method for adjusting gimbal parameter, comprising:
controlling a supply of power to a motor upon a detection of a gimbal parameter adjustment event and recording rotational angular velocity data of a gimbal axis controlled by the motor at respective time points;
calculating angular acceleration data at the respective time points based on the rotational angular velocity data, and determining a peak frequency within a preset frequency band after performing a frequency conversion on the angular acceleration data; and
configuring the peak frequency as a trap frequency of the motor to filter out a signal sending to the motor and having a frequency of the trap frequency.

2. The method according to claim 1, wherein controlling a supply of power to a motor upon a detection of a gimbal parameter adjustment event and recording rotational angular velocity data of a gimbal axis controlled by the motor at respective time points comprises:
controlling a power supplying current to the motor to be zero upon a detection of the gimbal parameter adjustment event;
starting a timing process when the power supplying current is controlled to be zero, and selecting a predefined reference current value to supply power to the motor when a timed duration reaches a predefined first duration threshold; and
recording the rotational angular velocity data of the gimbal axis controlled by the motor at the respective time points in a power supplying process.

3. The method according to claim 1, wherein controlling a supply of power to a motor upon a detection of a gimbal parameter adjustment event and recording rotational angular velocity data of a gimbal axis controlled by the motor at respective time points comprises:
controlling a power supplying current to the motor to be zero upon a detection of the gimbal parameter adjustment event;
starting a timing process when the power supplying current is controlled to be zero, selecting a predefined reference current value to supply power to the motor when a timed duration reaches a predefined first duration threshold, recording initial rotational angular velocity data of the gimbal axis controlled by the motor at the respective time points in a power supplying process,
controlling the power supplying current to the motor to be zero when a power supplying duration reaches a predefined second duration threshold, recording the initial rotational angular velocity data, and repeating the steps until the number of recording times reaches a predefined threshold of recording times; and
averaging the initial rotational angular velocity data at the respective time points obtained in each power supplying process and using an averaged result as the rotational angular velocity data of the respective time points in the power supplying process.

4. The method according to claim 1, further comprising:
calculating a change rate of rotational angular velocity based on the recorded rotational angular velocity data of the respective time points and a recording duration;
acquiring a predefined reference angular velocity change rate and a reference control loop proportional gain; and
calculating a current actual proportional gain of a control loop of the gimbal axis controlled by the motor based on the calculated change rate of the rotational angular velocity, the reference angular velocity change rate, and the reference control loop proportional gain.

5. The method according to claim 4, wherein controlling supply of power to a motor upon a detection of a gimbal parameter adjustment event and recording rotational angular velocity data of a gimbal axis controlled by the motor at respective time points comprise:

detecting whether a gimbal parameter adjustment button is pressed and triggered, and if yes, determining that a gimbal parameter adjustment event is detected.

6. A gimbal parameter adjustment device, comprising:
a processing module configured to:
control a supply of power to a motor upon a detection of a gimbal parameter adjustment event, and
record rotational angular velocity data of a gimbal axis controlled by the motor at respective time points;
a calculation module configured to:
calculate angular acceleration data at the respective time points based on the rotational angular velocity data, and
determine a peak frequency within a preset frequency band after the angular acceleration data is subject to a frequency conversion; and
a configuration module configured to configure the peak frequency as a trap frequency of the motor to filter out a signal sending to the motor and having a frequency of the trap frequency.

7. The device according to claim 6, wherein the processing module comprises:
a first control unit configured to control a power supplying current to the motor to be zero upon a detection of the gimbal parameter adjustment event;
a first processing unit configured to:
start a timing process when the power supplying current is controlled to be zero, and
select a predefined reference current value to supply power to the motor when a timed duration reaches a predefined first duration threshold; and
a first recording unit configured to record the rotational angular velocity data of the gimbal axis controlled by the motor at the respective time points in a power supplying process.

8. The device according to claim 6, wherein the processing module comprises:
a second control unit configured to control a power supplying current to the motor to be zero upon a detection of the gimbal parameter adjustment event;
a second processing unit configured to:
start a timing process when the power supplying current is controlled to be zero,
select a predefined reference current value to supply power to the motor when a timed duration reaches a predefined first duration threshold,
record initial rotational angular velocity data of the gimbal axis controlled by the motor at the respective time points in a power supplying process,
control the power supplying current to the motor to be zero when a power supply duration reaches a predefined second duration threshold,
record the initial rotational angular velocity data, and
repeat the steps until the number of recording times reaches a predefined threshold of recording times; and
a second recording unit configured to average the initial rotational angular velocity data at the respective time points obtained in each power supplying process and using an averaged result as the rotational angular velocity data of the respective time points in the power supplying process.

9. The device according to claim 6, further comprising:
a change calculation module configured to calculate a change rate of rotational angular velocity based on the recorded rotational angular velocity data of the respective time points and a recording duration;
an acquisition module configured to acquire a predefined reference angular velocity change rate and a reference control loop proportional gain; and
a gain calculation module configured to calculate a current actual proportional gain of a control loop of the gimbal axis controlled by the motor based on the calculated change rate of the rotational angular velocity, the reference angular velocity change rate, and the reference control loop proportional gain.

10. The device according to claim 9, further comprising:
a detection module configured to:
detect whether a gimbal parameter adjustment button is pressed and triggered, and
if yes, determine that a gimbal parameter adjustment event is detected.

11. A gimbal apparatus, comprising:
one or more gimbal axes; and
a motor and a controller, configured to control the one or more gimbal axes to rotate, wherein:
the controller is configured to:
control a supply of power to a motor upon a detection of a gimbal parameter adjustment event,
record rotational angular velocity data of a gimbal axis controlled by the motor at respective time points,
calculate angular acceleration data at the respective time points based on the rotational angular velocity data,
determine a peak frequency within a preset frequency band after performing a frequency conversion on the angular acceleration data, and
configure the peak frequency as a trap frequency of the motor to filter out a signal sending to the motor and having a frequency of the trap frequency.

12. The gimbal apparatus according to claim 11, wherein:
the controller is further configured to:
calculate a change rate of rotational angular velocity based on the recorded rotational angular velocity data of the respective time points and a recording duration,
acquire a predefined reference angular velocity change rate and a reference control loop proportional gain, and
calculate a current actual proportional gain of a control loop of the gimbal axis controlled by the motor based on the calculated change rate of the rotational angular velocity, the reference angular velocity change rate, and the reference control loop proportional gain.

13. The gimbal apparatus according to claim 11, further comprising:
a parameter adjustment button; and
the controller is further configured to:
detect whether a gimbal parameter adjustment button is pressed and triggered, and
if yes, determine that a gimbal parameter adjustment event is detected.

\* \* \* \* \*